Aug. 9, 1927.
N. C. PIKE
1,638,456
DISPENSING DEVICE
Filed Jan. 31, 1927
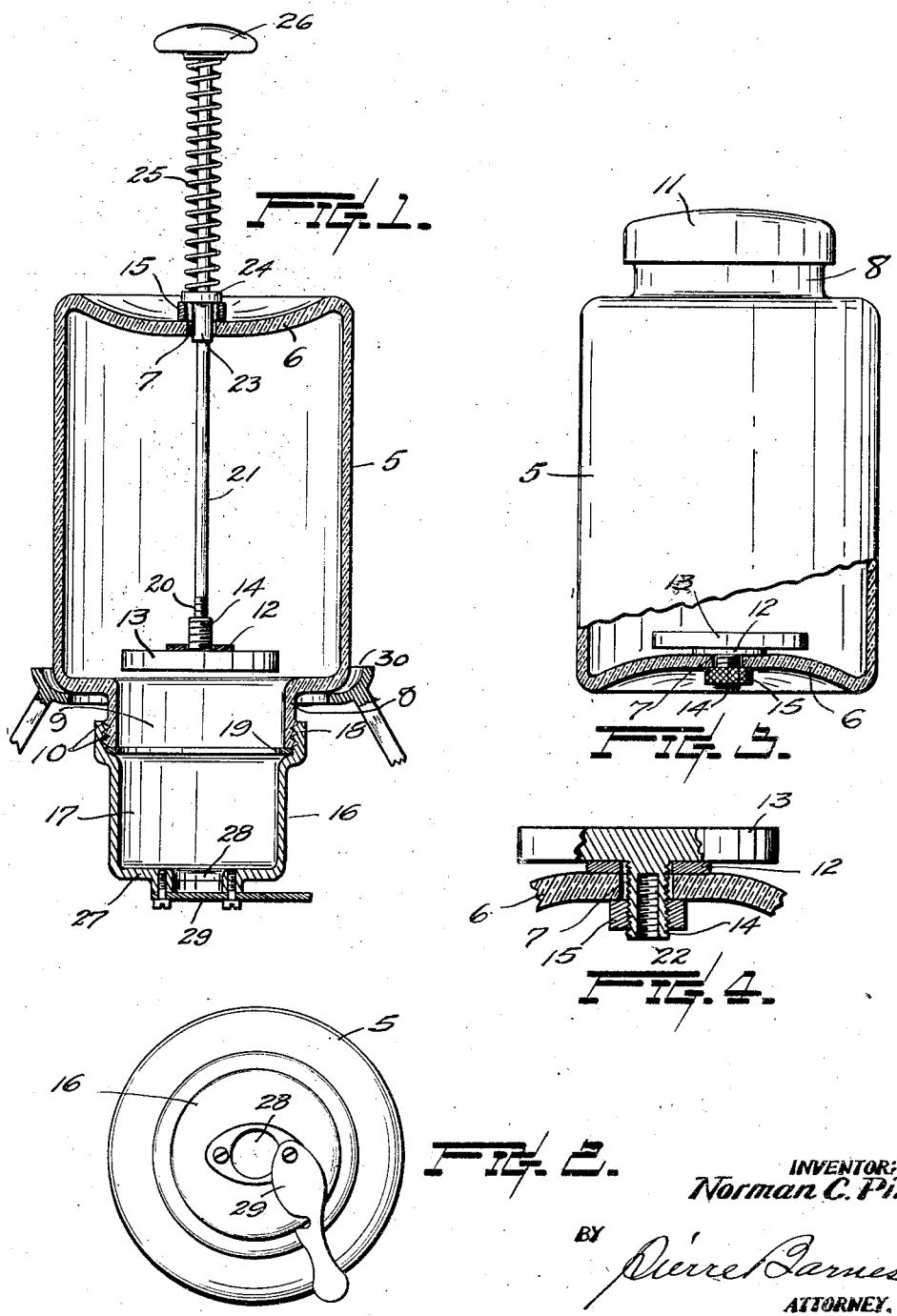
INVENTOR:
Norman C. Pike
BY
ATTORNEY.

Patented Aug. 9, 1927.

1,638,456

UNITED STATES PATENT OFFICE.

NORMAN C. PIKE, OF SEATTLE, WASHINGTON.

DISPENSING DEVICE.

Application filed January 31, 1927. Serial No. 165,008.

This invention relates to a dispensing device; and has for an object to provide a device of this character which is adapted more especially for delivering a predetermined quantity of a semi-fluid material from a container.

Another object is the provision of a dispensing device wherein certain of the operative parts are adapted to be used interchangeably with different containers whereby a depleted container may be replaced by a charged one.

Other specific objects and advantages of the invention will appear in the following description.

The invention consists in the novel construction, adaptation and combination of parts hereinafter described and claimed.

In the accompanying drawings—

Figure 1 is a view partly in elevation and partly in transverse vertical section of devices embodying the present invention and illustrated in its operative position. Fig. 2 is an underside view of Fig. 1, the supporting stand being omitted. Fig. 3 is an elevational view of the container shown in a position reversed from that in which it is represented in Fig. 1, and including a cap for closing the container mouth, a portion of the container being broken away to show in elevation the plunger and the securing means therefor when employed to close the aperture in the container bottom. Fig. 4 is a detail vertical sectional view to an enlarged scale of parts shown in Fig. 3.

The vessel 5 which serves as the container for gelatinous material which is to be dispensed by my device comprises a bottle or jar, preferably of glass, having a bottom wall 6 provided with a central aperture 7 and a neck 8 with a relatively large mouth 9 at its other end.

This neck is provided exteriorly with screw threads 10 for engaging screw threads provided in a cap such as 11 (Fig. 3) for securing the cap in place.

The vessel's bottom aperture 7 is, upon occasion, closed as by means of a gasket 12 of rubber, or other suitable substance, interposed between the vessel bottom 6 and a circular disk 13, hereinafter termed the piston, which is provided with a screw threaded stem 14 extending through the aperture 7 to receive a securing nut 15 which engages against the underside of the vessel, as shown in Fig. 3. To use the vessel for dispensing purposes, the cap 11 is replaced by cup shaped attachment 16 (Fig. 1) having a cylindrical chamber 17 of an internal diameter approximating the diameter of the mouth 9 and also the piston 13, and an enlarged socket portion 18 which is screw threaded for engaging the screw threads 10 of the vessel neck. 19 represents a gasket for making a non-leakable joint between the neck end of the vessel and an annular shoulder provided in the neck attachment 16. The attachment 16 has an end wall 27 having an orifice 28 for which is provided a gate valve 29.

For dispensing purposes the nut 15 is removed from the stem 14 and with the latter held between the thumb and a finger of one hand of the operator a screw threaded end 20 of a rod 21 is engaged in a screw threaded socket 22 (Fig. 4) provided in the piston stem 14.

A bushing 23 is then shifted lengthwise of the rod 21 through the nut 15 (Fig. 1) into the aperture 7. Said bushing is provided with a peripheral flange 24 to bear against the nut and serve as a bearing for an end of a spring 25 which surrounds the rod and has its other end engageable with a knob handle 26 provided upon the rod.

With the parts thus arranged and the gate valve 29 in its orifice-closing position the vessel is placed in an inverted position as shown in Fig. 1 and is supported as by means of a stand as indicated by 30. To dispense gelatinous material from the vessel the operator first pushes down upon the handle 26 of the rod 21 to cause the piston to occupy approximately the position in which it is shown in Fig. 1. By now swinging the gate valve from the orifice 28 and further pushing down upon the handle 26 the piston 13 is forced into the chamber 9 to expel the material therefrom through the orifice 28 into a receptacle which may be held therebelow. By marking the rod at predetermined distances apart measured quantities of the material can be delivered from the vessel in each downward movement of the piston.

The invention is peculiarly adapted for use in the dispensing of commodities such as mayonnaise dressing, fruit jellies, and the like, as it enables an emptied vessel to be returned to the place of supply for a thorough cleaning before being refilled for repeated use.

The construction and manner of employing my invention will, it is thought, be understood from the foregoing description.

What I claim, is,—

1. In apparatus of the character described, a vessel having an aperture in one end thereof and a tubular neck at its other end, means for closing said aperture, said means including a piston having a screw threaded stem adapted to extend through said aperture, and a nut taking upon said stem and bearing against the vessel, said stem being provided with a screw threaded socket, and a rod engageable within said socket for coupling the rod to the piston for operating the piston in said neck and for conveying the piston into and from its operative relation with respect to the apertured end of the vessel.

2. In a device of the class described, a container having at one end a cylindrical neck terminating in a mouth, and at the other end an aperture in alignment with the neck, means for closing said aperture and discharging material from the container through the neck, said means including a piston having a stem, exteriorly threaded, adapted to extend through the aperture, a nut threadedly engaging the stem and bearing against the container, a threaded socket in the stem, and a rod engageable in the socket for operating the piston in the neck and for conveying the piston into closed engagement with the aperture.

3. In a device for dispensing semi-fluid material, a container having at one end a cylindrical neck terminating in a mouth, and at the other end an aperture, piston means for closing the aperture and for discharging said material from the container through the neck, including a piston having an exteriorly threaded stem adapted to extend through the aperture, a nut engaging the stem and bearing against the container, a socket in the stem, and a piston rod detachably engaging the socket for operating the piston in the neck and for conveying the piston into operative position relative to the apertured end of the container.

4. A dispensing device, comprising a container having an aperture in one end and a cylindrical neck terminating in a mouth at its other end, a piston for discharging material from the container, having an exteriorly threaded stem, a threaded socket in the stem, a piston rod, threaded at one end, a bushing, provided with a peripheral flange, slidably mounted on the rod, said stem being adapted to extend through the aperture and permit the threaded end of the rod to be detachably connected with said socket exteriorly of the container, a nut adapted to threadedly engage the stem and bear against the container to permit the piston to function as a closure for the aperture, and to provide a bearing for the bushing when the piston is in operative position for discharging material from the container, and a member, detachably connected with the neck, having a discharge orifice and a closure therefor.

5. In a dispensing device having a container provided with an aperture in one end and a cylindrical neck at its other end, a piston, disposed within the container, having an exteriorly threaded stem, adapted to extend through the aperture, a threaded socket in the stem, a rod, carrying a knob at one end and exterior screw threads at its other end engageable in the socket, for operating the piston in the neck and for conveying the piston into closed engagement with the aperture, a flanged bushing slidably mounted on the rod, a spiral spring disposed on the rod between the knob and bushing, a nut adapted to threadedly engage the stem and bear against the container, and a receptacle detachably secured to the neck, having a discharge orifice and a closure therefor.

6. In a dispensing device having a container provided with an aperture in one end and a cylindrical neck terminating in a mouth at the other end, a piston, disposed within the container, for discharging material from the container through the neck and providing a closure for the aperture, a rod for operating the piston in the neck and for conveying the piston into closed engagement with the aperture, and means whereby the rod may be detachably secured to the piston through said aperture and exteriorly of the container.

Signed at Seattle, Washington, this 6th day of May, 1926.

NORMAN C. PIKE.